US012049247B2

(12) United States Patent
Lybbert

(10) Patent No.: US 12,049,247 B2
(45) Date of Patent: Jul. 30, 2024

(54) AUTOMATIC BRAKING SYSTEM FOR A WALKER AND RELATED WALKERS AND METHODS

(71) Applicant: Scientia Corp., Cardston (CA)

(72) Inventor: Carter Lybbert, Vineyard, UT (US)

(73) Assignee: Scientia Corp., Cardston (CA)

( * ) Notice: Subject to any disclaimer, the term of this patent is extended or adjusted under 35 U.S.C. 154(b) by 477 days.

(21) Appl. No.: 17/303,389

(22) Filed: May 27, 2021

(65) Prior Publication Data

US 2021/0370997 A1 Dec. 2, 2021

Related U.S. Application Data

(60) Provisional application No. 63/032,516, filed on May 29, 2020.

(51) Int. Cl.
*B62B 5/04* (2006.01)
*A61H 3/04* (2006.01)

(52) U.S. Cl.
CPC ............. *B62B 5/0409* (2013.01); *A61H 3/04* (2013.01); *B62B 5/0438* (2013.01); *A61H 2003/046* (2013.01)

(58) Field of Classification Search
None
See application file for complete search history.

(56) References Cited

U.S. PATENT DOCUMENTS

| 5,794,639 A | 8/1998 | Einbinder |
| 7,708,120 B2 | 5/2010 | Einbinder |
| 9,770,380 B1 | 9/2017 | Dalton |
| 9,968,507 B2 | 5/2018 | Rabin et al. |
| 11,003,247 B1* | 5/2021 | Sinclair ................. G06T 19/006 |
| 2005/0229961 A1 | 10/2005 | Takizawa et al. |
| 2005/0232460 A1* | 10/2005 | Schmiz ............. B60R 21/01538 |
| | | 382/103 |
| 2008/0072942 A1 | 3/2008 | Warren |
| 2011/0224583 A1* | 9/2011 | Lequeux ............... A61H 1/0237 |
| | | 482/4 |

(Continued)

FOREIGN PATENT DOCUMENTS

| CN | 108904229 A | 11/2018 |
| DE | 202011104720 U1 | 11/2011 |

(Continued)

*Primary Examiner* — David E Allred
(74) *Attorney, Agent, or Firm* — Polsinelli PC

(57) ABSTRACT

A walker is disclosed. The walker includes a frame, a wheel, a brake selectively positionable in an engaged state, in which the brake resists wheel rotation, or a disengaged state, in which the brake does not resist wheel rotation, a brake actuator configured to place the brake in the engaged state or the disengaged state, a handle, a hand-position sensor configured to provide a first signal responsive to the handle being grasped in a walking grasp and to provide a second signal responsive to the handle being grasped in a standing/sitting grasp, and a processor configured to cause the brake actuator to place the brake in the disengaged state based at least in part on the first signal and to cause the brake actuator (Continued)

to place the brake in the engaged state based at least in part on the second signal. Related devices, systems, and methods are also disclosed.

26 Claims, 9 Drawing Sheets

(56) References Cited

U.S. PATENT DOCUMENTS

| | | | | |
|---|---|---|---|---|
| 2012/0029696 | A1* | 2/2012 | Ota | B60L 50/52 |
| | | | | 700/250 |
| 2014/0345956 | A1* | 11/2014 | Kojina | B62B 5/0073 |
| | | | | 180/19.1 |
| 2015/0053042 | A1* | 2/2015 | Shirakawa | B62B 5/06 |
| | | | | 74/523 |
| 2015/0066275 | A1* | 3/2015 | Masaki | B62B 5/0073 |
| | | | | 180/19.1 |
| 2015/0209204 | A1* | 7/2015 | Hsu | A61G 5/046 |
| | | | | 180/19.1 |
| 2016/0030273 | A1 | 2/2016 | Han | |
| 2016/0253890 | A1* | 9/2016 | Rabinowitz | G08B 21/0461 |
| | | | | 340/539.13 |
| 2017/0258664 | A1 | 9/2017 | Purcell | |
| 2019/0091092 | A1* | 3/2019 | McGrath | A61H 3/00 |
| 2019/0142684 | A1* | 5/2019 | Liang | A61H 1/00 |
| | | | | 135/66 |
| 2020/0038703 | A1* | 2/2020 | Cleary | G06F 3/0346 |
| 2020/0242345 | A1* | 7/2020 | Huang | G06V 10/44 |
| 2020/0376321 | A1* | 12/2020 | Davis | A63B 21/0058 |
| 2022/0211568 | A1* | 7/2022 | AlGhazi | A61B 5/1117 |
| 2023/0165745 | A1* | 6/2023 | Kong | A61N 5/0613 |
| | | | | 601/148 |

FOREIGN PATENT DOCUMENTS

| | | | | |
|---|---|---|---|---|
| EP | 3300713 | A1 * | 4/2018 | A61H 31/005 |
| EP | 3487464 | A1 | 5/2019 | |
| GB | 2538953 | A | 12/2016 | |
| IN | 201621040423 | | 10/2017 | |
| JP | 2017-019303 | A | 1/2017 | |
| KR | 10-2009-0074315 | A | 7/2009 | |
| KR | 10-2013-0101777 | A | 9/2013 | |
| KR | 10-1389728 | B1 | 4/2014 | |
| KR | 10-1902995 | B1 | 10/2018 | |
| KR | 2020-0000055 | A | 1/2020 | |
| TW | 201043217 | A | 12/2010 | |
| TW | 201529063 | A | 8/2015 | |
| WO | 2006/074029 | A2 | 7/2006 | |
| WO | 2012/118263 | A1 | 9/2012 | |
| WO | 2015/043286 | A1 | 4/2015 | |
| WO | 2015/148578 | A2 | 10/2015 | |
| WO | WO-2017104847 | A1 * | 6/2017 | A61B 5/1036 |
| WO | 2018/014139 | A1 | 1/2018 | |
| WO | 2019/184084 | A1 | 10/2019 | |

* cited by examiner

AUTOMATIC BRAKING SYSTEM FOR A WALKER AND RELATED WALKERS AND METHODS

CROSS-REFERENCE TO RELATED APPLICATION

This application claims the benefit of the priority date of U.S. Provisional Patent Application No. 63/032,516, filed May 29, 2020, and titled "Safe Four-Wheeled Walker with Imminent Fall Detection and Automated Braking System," the disclosure of which is incorporated herein in its entirety by this reference.

FIELD

This description relates, generally, to an automatic braking system and related walkers and methods. More specifically, some embodiments relate to an automatic braking system for a walker which may, without limitation, better enable a user to receive support from the walker in various orientations and use cases.

BACKGROUND

A walker may be a device configured to support a person in walking and/or standing. The walker may be a mobile device which the person may use for balance or support, e.g., while taking steps and/or between taking steps. Additionally, some walkers may include a seat upon which a person may sit.

BRIEF SUMMARY

Some embodiments may include a walker. The walker may include a frame, a wheel positioned at a bottom of the frame, a brake, a brake actuator, a handle positioned at a top of the frame, a hand-position sensor, and a processor. The brake may be selectively positionable in an engaged state, in which the brake resists rotation of the wheel, or a disengaged state, in which the brake does not resist rotation of the wheel. The brake actuator may be configured to place the brake in the engaged state or the disengaged state. The hand-position sensor may be configured to provide a first signal responsive to the handle being grasped in a walking grasp and to provide a second signal responsive to the handle being grasped in a standing/sitting grasp. The processor may be communicatively connected to the brake actuator and the hand-position sensor. The processor may be configured to cause the brake actuator to place the brake in the disengaged state based at least in part on the first signal and to cause the brake actuator to place the brake in the engaged state based at least in part on the second signal.

Some embodiments may include an automatic braking system for a walker. The automatic braking system may include a brake actuator, a hand-position sensor, and a processor. The brake actuator may be configured to place a brake of a walker in an engaged state, in which the brake resists rotation of a wheel of the walker, or a disengaged state, in which the brake does not resist rotation of the wheel. The hand-position sensor may be configured to detect a portion of a hand of a person at a location of a handle of the walker when the person stands behind the walker, facing the walker, and grasps the handle, the hand-position sensor further configured to detect an absence of a portion of a hand of the person at the location of the handle when the person stands behind the walker, facing away from the walker, and grasps the handle. The processor may be communicatively connected to the brake actuator and the hand-position sensor. The processor may be configured to determine whether to cause the brake actuator to place the brake to be in the engaged state or the disengaged state based at least in part on whether the hand-position sensor detects a portion of a hand at the location.

Some embodiments may include a method of controlling a brake of a walker. The method may include receiving, from a hand-position sensor, an indication of an orientation of a person grasping a handle of a walker and standing behind on the walker. The method may also include causing a brake actuator to place a brake in a disengaged state based at least in part on an indication from the hand-position sensor that the person is grasping a handle of the walker and facing toward the walker. The method may also include causing the brake actuator to place the brake in an engaged state based at least in part on an indication from the hand-position sensor that the person is not grasping a handle of the walker or not facing toward the walker.

BRIEF DESCRIPTION OF THE SEVERAL VIEWS OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
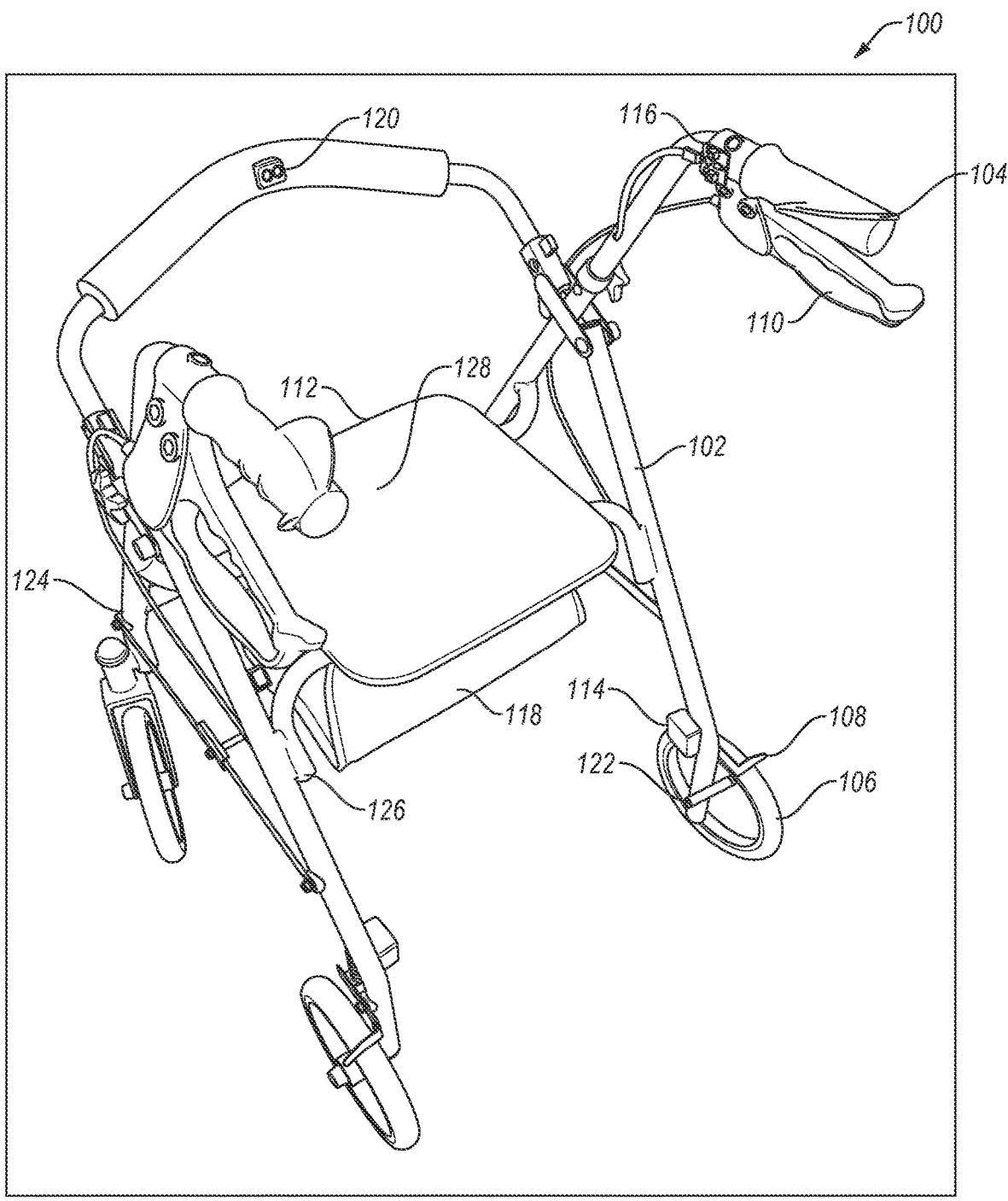
FIG. 1 illustrates an example walker according to one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

A walker may be a device configured to support a person in walking and/or standing. The walker may be a mobile device which the person may use for balance or support, e.g., while taking steps and/or between taking steps. The walker may include one or more handles which the person may hold, place a hand on, and/or lean on for support. The walker may include a frame extending from the one or more handles to the ground. The frame may be coupled to feet or wheels that may contact the ground. The walker may include manually-operated brakes configured to resist rotation (e.g., slow, stop, or prevent rotation) of respective wheels. One way of using such a walker may include: manually engaging the brakes to prevent the wheels from rotating (and the walker rolling), taking one or more steps toward the walker, standing still, disengaging the brakes, moving the walker forward, and manually reengaging the brakes. Additionally, some walkers may include a seat, coupled to the frame, upon which a person may sit. The seat may be positioned above the feet or wheels such that when a person is seated thereon, the person's center of gravity is between the feet or wheels.

The inventor of this disclosure observed persons using walkers and recognized situations in which the persons had a higher than usual risk of falling. The situations include: when a person is in the act of sitting on the seat of a walker (e.g., lowering their body onto the seat or preparing to lower their body onto the seat), when a person is standing from the seat (e.g., raising their body from sitting or preparing to raise their body from sitting), when a person is seated on the walker and the walker rolls unexpectedly, and when a person is walking behind a walker and the walker begins to move more quickly than the person and/or more quickly than the person intends.

Some embodiments may include an automatic braking system and/or a walker including an automatic braking system that may address the foregoing and other issues. The automatic braking system may be configured to cause brakes of the walker to engage in response to detecting certain conditions to increase the safety of a person using a walker. The automatic braking system may include one or more brake actuators configured to cause the brakes to engage, a processor configured to determine when to engage the brakes, and one or more sensors configured to detect the certain conditions. The certain conditions may be indicative of one of the situations in which persons have a higher than usual risk of falling.

For example, the automatic braking system (e.g., including the sensors) may be configured to detect conditions indicative that a person is in the act of sitting on a seat of the walker, in the act of standing from the seat, seated on the seat, or using the walker to stand and/or walk. Further, the automatic braking system (e.g., including the brake actuators and/or the processor) may be configured to engage the brakes in response to detecting conditions indicative that the person is in the act of sitting on a seat of the walker, in the act of standing from the seat, or seated on the seat. Further, the automatic braking system may be configured to disengage the brakes in response to detecting conditions indicative that the person is using the walker to stand and/or walk.

Additionally or alternatively, in some embodiments, the automatic braking system may be configured to engage the brakes unless the automatic braking system detects conditions indicative that a person is using the walker to stand and/or walk.

As a specific example, the sensors may include a hand-position sensor configured to provide to a first signal responsive to a handle of the walker being grasped in a walking grasp and a second signal responsive to the handle being grasped in a standing/sitting grasp. The processor may be configured to cause the brake actuator to disengage the brake based at least in part on the first signal and to engage the brake based at least in part on the second signal. Thereby, the automatic braking system may be configured to prevent the walker from rolling while a person is in the act of sitting on a seat of the walker or in the act of standing from the seat.

As another specific example, the sensors may include a distance sensor configured to provide a signal indicative of a distance between the distance sensor and a person. The processor may be configured to make a determination regarding the person based on the signal from the distance sensor. For example, the processor may be configured to determine that the person is lowering themselves onto the seat, sitting on the seat, or raising themselves from the seat based on the signal. The processor may be configured to cause the brake actuator to engage the brake responsive to a determination that the person is lowering themselves onto the seat, sitting on the seat, or raising themselves from the seat. Thereby, the automatic braking system may prevent the walker from rolling while a person is in the act of lowering themselves onto the seat, seated on the seat, or raising themselves from the seat.

Further, in some embodiments, the automatic braking system may be configured to use a signal from the distance sensor to determine that the walker is rolling away from a person. The automatic braking system may be configured to engage the brakes to slow or stop the walker to prevent the walker from rolling away from the person.

Further, in some embodiments, the automatic braking system may include a wheel-rotation sensor. Using the wheel-rotation sensor, the automatic braking system may be configured to determine that a wheel of the walker is exceeding a rotation-speed threshold. In response to determining that the wheel is exceeding the rotation-speed threshold, the automatic braking system may be configured to slow or stop the wheel.

FIG. 1 illustrates an example walker 100 according to one or more embodiments. Walker 100 includes a frame 102, a handle 104, a wheel 106, a brake 108, a hand brake 110, and a seat 112. Walker 100 may have a front side 124, a back side 126, and a center of mass 128. Walker 100 may further include an automatic braking system including a brake actuator 114, a hand-position sensor 116, a processor 118, a distance sensor 120, and a wheel-rotation sensor 122. In some embodiments, the automatic braking system may be installed onto an existing walker 100. In other embodiments, one or more components of the automatic braking system may integrated into a walker 100 before delivery to a customer.

Walker 100 may be configured to be used by a person for support as they stand and/or walk at back side 126 of walker 100. Frame 102 may be configured to support the weight of the person at handle 104 and/or at seat 112. Frame 102 may support handle 104 at a top of frame 102. Frame 102 may be supported by wheel 106 at a bottom of frame 102. Frame 102 may include multiple elongate members (e.g., tubes, poles, braces, beams) interconnected with one another and positioned to enable a user to grasp the handle 104 and provide support to the user when the walker 100 is in various orientations.

Handle 104 may be configured to be grasped by the person as they stand or walk at back side 126. Seat 112 may be configured to be sat upon by the person. Handle 104 may be configured to be grasped by the person as they are in the act of sitting on or rising from seat 112. Walker 100 may include one or more handles. For example, as illustrated in FIG. 1, walker 100 may include two handles positioned at back side 126 on opposite sides of walker 100.

Wheel 106 may be configured to roll in response to forces exerted on the walker 100, allowing walker 100 to be moved. Walker 100 may include one or more wheels 106. For example, as illustrated in FIG. 1, walker 100 may include four wheels 106, each located proximate to an end of a corresponding leg of the frame 102. In other embodiments, not illustrated, walker 100 may include three wheels, e.g., two at back side 126 and one at front side 124. In other embodiments, not illustrated, walker 100 may include two wheels, e.g., at back side 126 and two feet at front side 124.

Brake 108 may be configured to be selectively positionable in an engaged state, in which brake 108 resists rotation of wheel 106, or in a disengaged state, in which brake 108 does not resist rotation of wheel 106. In the engaged state, brake 108 may be configured to slow, stop, and/or prevent rotation of wheel 106. Brake 108 may include, any suitable means of resisting rotation of wheel 106, For example, a given brake 108 may be configured as hydraulic disc brakes, cable disc brakes, clamp brakes, friction-lever brakes, or drum brakes. Additional detail regarding the engaged state is provided with regard to FIG. 3A. Additional detail regarding the disengaged state is provided with regard to FIG. 3B. Walker 100 may include one or more brakes 108. For example, as illustrated in FIG. 1, walker 100 may include one brake 108 at each wheel 106 at back side 126. In other embodiments, not illustrated, walker 100 may include four brakes 108, e.g., one for each wheel 106.

Hand brake 110 may be configured to operate brake 108, enabling manual operation of the brake 108 in addition to the automatic operation of the brake 108 described herein. For example, pulling hand brake 110 may result in a cable attached to brake 108 being pulled which may cause brake 108 to engage wheel 106 to resist rotation of wheel 106.

Brake actuator 114 may be configured to place brake 108 in the engaged state or the disengaged state. Brake actuator 114 may include an actuator configured to cause motion in response to an electrical signal. For example, based on an electrical signal (e.g., from processor 118), brake actuator 114 may cause brake 108 to engage wheel 106 to resist rotation of wheel 106. The brake actuator 114 may include, for example, a solenoid, a linear actuator, a rotary actuator, a stepper motor, or other actuators known in the art. Walker 100 may include one or more brake actuators 114. For example, as illustrated in FIG. 1, walker 100 may include one brake actuator 114 at one brake 108. As another example, walker 100 may include one brake actuator 114 at each brake 108 (not illustrated).

Hand-position sensor 116 may be positioned at, on, or proximate to handle 104. Walker 100 may include one or more hand-position sensors 116. For example, as illustrated in FIG. 1, walker 100 may include one hand-position sensor 116 at, on, or proximate to handle 104. As another example, walker 100 may include one hand-position sensor at each handle 104 (not illustrated).

Hand-position sensor 116 may be configured to provide a first signal responsive to handle 104 being grasped in a walking grasp and to provide a second signal responsive to handle 104 being grasped in a standing/sitting grasp. In some embodiments, hand-position sensor 116 may be configured to detect the presence of a portion of a hand when the hand is oriented in the walking grasp and to not to detect (e.g., to detect the absence of) a hand when the hand is in the standing/sitting grasp. Thus, hand-position sensor 116 may be configured to differentiate between a walking grasp and a standing/sitting grasp by detecting relevant portions of a user's hand when in a walking grasp and not detecting those portions of the user's hand when in a standing/sitting grasp. Additionally or alternatively, the hand-position sensor 116 may be configured to detect an absence of a portion of the hand when the hand grasps the handle 104 in the walking grasp and to detect the presence of a portion of the hand when the hand grasps the handle 104 in the sitting/standing grasp. Additionally or alternatively, the hand-position sensor 116 may be configured to detect a pressure pattern at handle. The pressure pattern may be indicative of the walking grasp or the standing/sitting grasp. Thus, by detecting the pressure pattern, hand-position sensor 116 may be configured to differentiate between the waling grasp and the standing/sitting grasp.

In some embodiments, hand-position sensor 116 may be configured to provide the second signal responsive to handle 104 not being grasped in the walking grasp. In some embodiments, hand-position sensor 116 may be configured to provide the first signal only in response to hand-position sensor 116 being grasped in the walking grasp and to provide the second signal otherwise.

In some embodiments, hand-position sensor 116 may be configured to detect the standing/sitting grasp and the walking grasp. In other words, hand-position sensor 116 may be configured to detect the standing/sitting grasp independent of detecting the walking grasp. In such embodiments, hand-position sensor 116 may be configured to provide the second signal responsive to detecting the standing/sitting grasp.

Generally, the walking grasp may be indicative of a person standing behind walker 100 (e.g., at back side 126) and facing toward walker 100. The walking grasp may be indicative of a person using walker 100 for support while standing or walking. Generally, the standing/sitting grasp may be indicative of a person standing behind walker 100 (e.g., at back side 126) and facing away from walker 100. The standing/sitting grasp may be indicative of a person in the act of sitting on, rising from sitting, or seated on seat 112 of walker 100.

Thus, hand-position sensor 116 may be configured to detect at least a portion of a hand of a person at handle 104 of walker 100 when the person stands behind walker 100 (e.g., at back side 126), facing walker 100, and grasps handle 104. Hand-position sensor 116 may be configured to detect an absence of those portions of the hand of the person at handle 104 when the person stands behind walker 100, facing away from walker 100, and grasps handle 104. Hand-position sensor 116 may be configured to provide the first signal (e.g., indicative of handle 104 being grasped in the walking grasp) when hand-position sensor 116 detects a hand at handle 104. Hand-position sensor 116 may be configured to provide the second signal (e.g., indicative of handle 104 being grasped in the standing/sitting grasp or not being grasped) when hand-position sensor 116 detects an absence of a hand at handle 104.

The walking grasp may be defined as a grasp in which a thumb of a hand is oriented towards front side 124. In contrast, the standing/sitting grasp may be defined as a grasp in which the thumb is oriented towards back side 126.

Additionally or alternatively, the walking grasp may be defined as a grasp in which a thumb of a hand is oriented generally towards center of mass 128. In contrast, the standing/sitting grasp may be defined as a grasp in which the thumb is oriented generally away from center of mass 128. Additional detail regarding the walking grasp is provided with regard to FIG. 2B and additional detail regarding the standing/sitting grasp is provided with regard to FIG. 2C.

Processor 118 may be configured to cause brake actuator 114 to place brake 108 in the disengaged state based at least in part on the first signal from hand-position sensor 116 (e.g., indicative of handle 104 being grasped in the walking grasp) and to cause brake actuator 114 to place brake 108 in the engaged state based at least in part the second signal from hand-position sensor 116 (e.g., indicative of handle 104 being grasped in the standing/sitting grasp or not being grasped). In other words, processor 118 may be configured to determine whether to cause brake actuator 114 to cause brakes 108 to be in the engaged state or the disengaged state based at least in part on whether hand-position sensor 116 detects a hand. Processor 118 may be or may include any suitable computing device, including, For example, a microprocessor, a general purpose processor, a special purpose processor, a DSP, an IC, an ASIC, a FPGA or other programmable logic device, discrete gate or transistor logic, discrete hardware components, or any combination thereof.

Distance sensor 120 may be configured to detect a distance between a person and distance sensor 120. Distance sensor 120 may be arranged on frame 102 such that a distance between the person and distance sensor 120 (or a change in distance between the person and the distance sensor 120) may be indicative of an action of the person. For example, the distance between the person and the distance sensor 120 (or change thereof over time) may be indicative that the person is in the act of approaching the seat to sit on the seat, seated on the seat, or rising from the seat. Processor 118 may be configured to make a determination regarding when the person is in the act of approaching the seat to sit on the seat, seated on the seat, or rising from the seat. Processor 118 may be configured to cause brake actuator 114 to place brake 108 in an engaged state responsive to a determination that the person is in the act of approaching the seat to sit on the seat, seated on the seat, or rising from the seat.

Additionally or alternatively, distance sensor 120 may be arranged on frame 102 such that a determination of distance (and/or change in distance) between the person and distance sensor 120 may be indicative of walker 100 moving away from (or being too far away from) the person. Processor 118 may be configured to cause brake actuator 114 to place brake 108 in an engaged state responsive to an indication from distance sensor 120 that the walker is moving away from (or is too far away from) the person.

Wheel-rotation sensor 122 may be configured to detect a rotation speed of wheel 106. The rotation speed of wheel 106 may be indicative of a speed of walker 100. Processor 118 may be configured to cause brake actuator 114 to place brake 108 in an engaged state responsive to the rotation speed of wheel 106 exceeding a rotation-speed threshold.

Hand-position sensor 116, distance sensor 120, and/or wheel-rotation sensor 122 may be configured to provide signals (e.g., the first signal the second signal, an indication of distance from the distance sensor, and/or an indication of rotation speed of wheel 106) to processor 118 through wires or wirelessly. For example, hand-position sensor 116, distance sensor 120, and/or wheel-rotation sensor 122 may include wireless communication equipment configured to transmit wireless signals according to any suitable protocol including e.g., BLUETOOTH®, and near-field communication (NFC).

In some embodiments, the automatic braking system may be configured to analyze and/or store data from one or more of the sensors (e.g., hand-position sensor 116, distance sensor 120 and/or wheel-rotation sensor 122). The data may be used to additionally improve the safety of using walker 100. For example, the data may be used by a machine-learning algorithm (either at processor 118 or at a remote computing device) to further improve safety of using walker 100 by identifying conditions (e.g., as observed by the sensors) at which causing brake actuator 114 to cause the brake 108 to be in the engaged state or the disengaged state may improve safety of using walker 100 (e.g., by preventing falls). For example, in cases in which hand-position sensor 116 comprises a pressure sensor, processor 118 may be configured to analyze pressure patterns and learn to recognize first pressure patterns indicative of a walking grasp and to differentiate the first pressure patterns from other pressure patterns, e.g., from second pressure patterns indicative of a standing/sitting grasp.

Figure 2A:
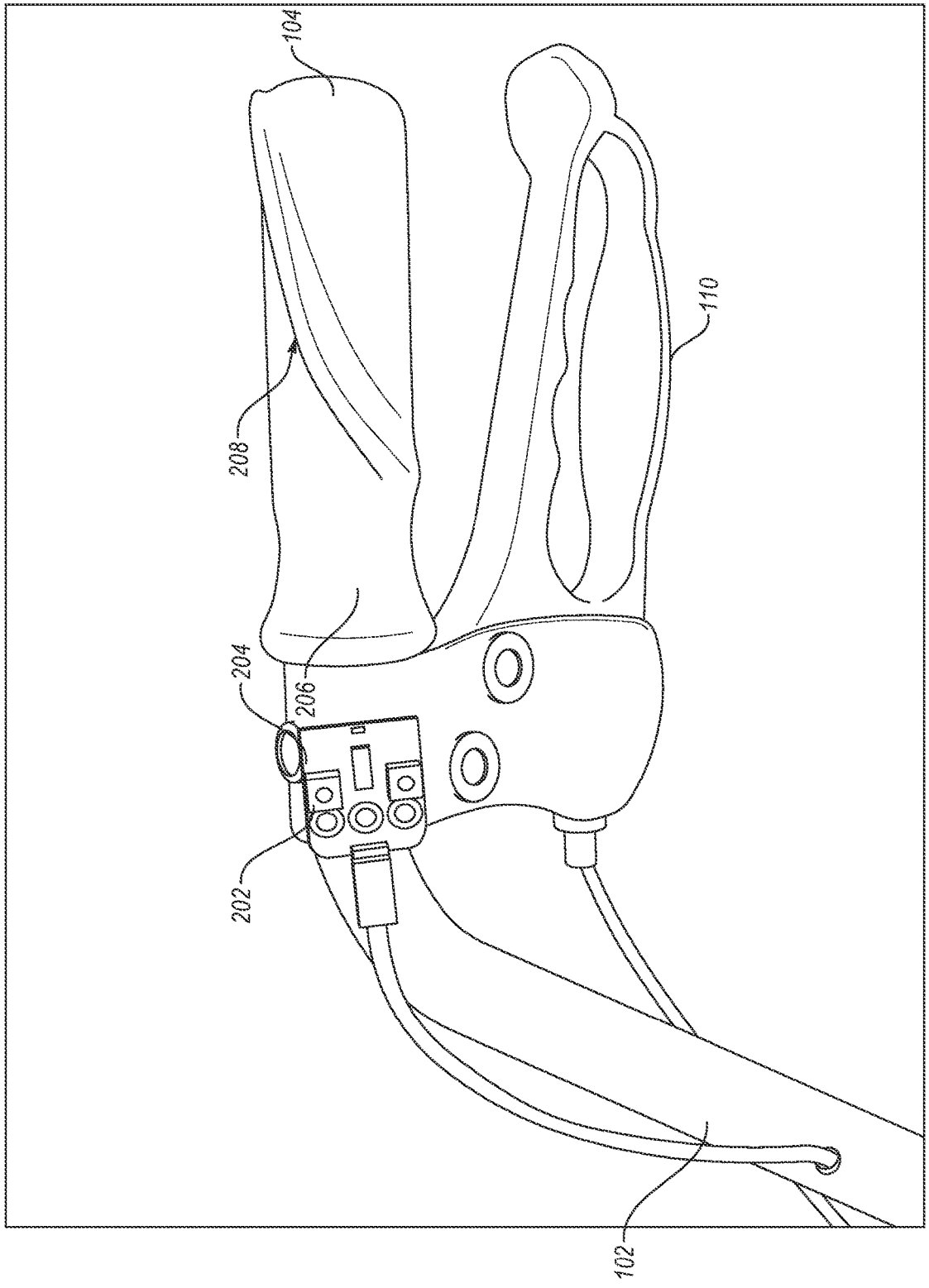
FIG. 2A illustrates an example handle of a walker according to one or more embodiments.

FIG. 2A illustrates an example handle 104 of a walker (e.g., walker 100 of FIG. 1) according to one or more embodiments. Hand-position sensor 202 is arranged at an upper portion of frame 102 at or proximate to handle 104 and is an example of a hand-position sensor (e.g., hand-position sensor 116 of FIG. 1) according to one or more embodiments.

Hand-position sensor 202 may be configured to detect a presence or absence of a hand (or a part of a hand) at a specific location on handle 104, e.g., thumb position 206. For example, hand-position sensor 202 may include a thumb sensor 204 configured to detect a presence or absence of a hand (or a part of a hand) at thumb position 206. The presence or absence of the hand (or a portion thereof) at thumb position 206 may be indicative of a grasp in which handle 104 is being grasped.

Thumb sensor 204 may be or may include any suitable proximity sensor, e.g., an infrared (IR) proximity sensor, a light-based rangefinder, a sonic range detector, a Doppler-effect sensor, an inductive proximity sensor, or a hall-effect sensor. For example, thumb sensor 204 may be arranged on frame 102 oriented at thumb position 206 and may be configured to detect a presence or absence of a hand (or a part of a hand) at thumb position 206.

Handle 104 may include backstop 208. Thumb sensor 204 may be arranged relative to backstop 208 such that backstop 208 limits the detection range of thumb sensor 204. Limiting the detection range of thumb sensor 204 may simplify determinations of detections by simplifying thresholds. For example, based on the arrangement of thumb sensor 204 relative to backstop 208, thumb sensor 204 may not be capable of receiving signals indicative of proximity from locations behind backstop 208 and detection ranges may be tuned accordingly.

Additionally or alternatively, thumb sensor 204 may be or may include any suitable sensor capable of detecting a presence or absence of a hand (or part of hand) e.g., a capacitive touch sensor, a pressure sensor, a temperature sensor, or a conductivity sensor. For example, thumb sensor 204 may include a conductive touch sensor (not illustrated) at thumb position 206. The conductive touch sensor may be configured to detect when a portion of a hand is at thumb position 206.

Figure 2B:
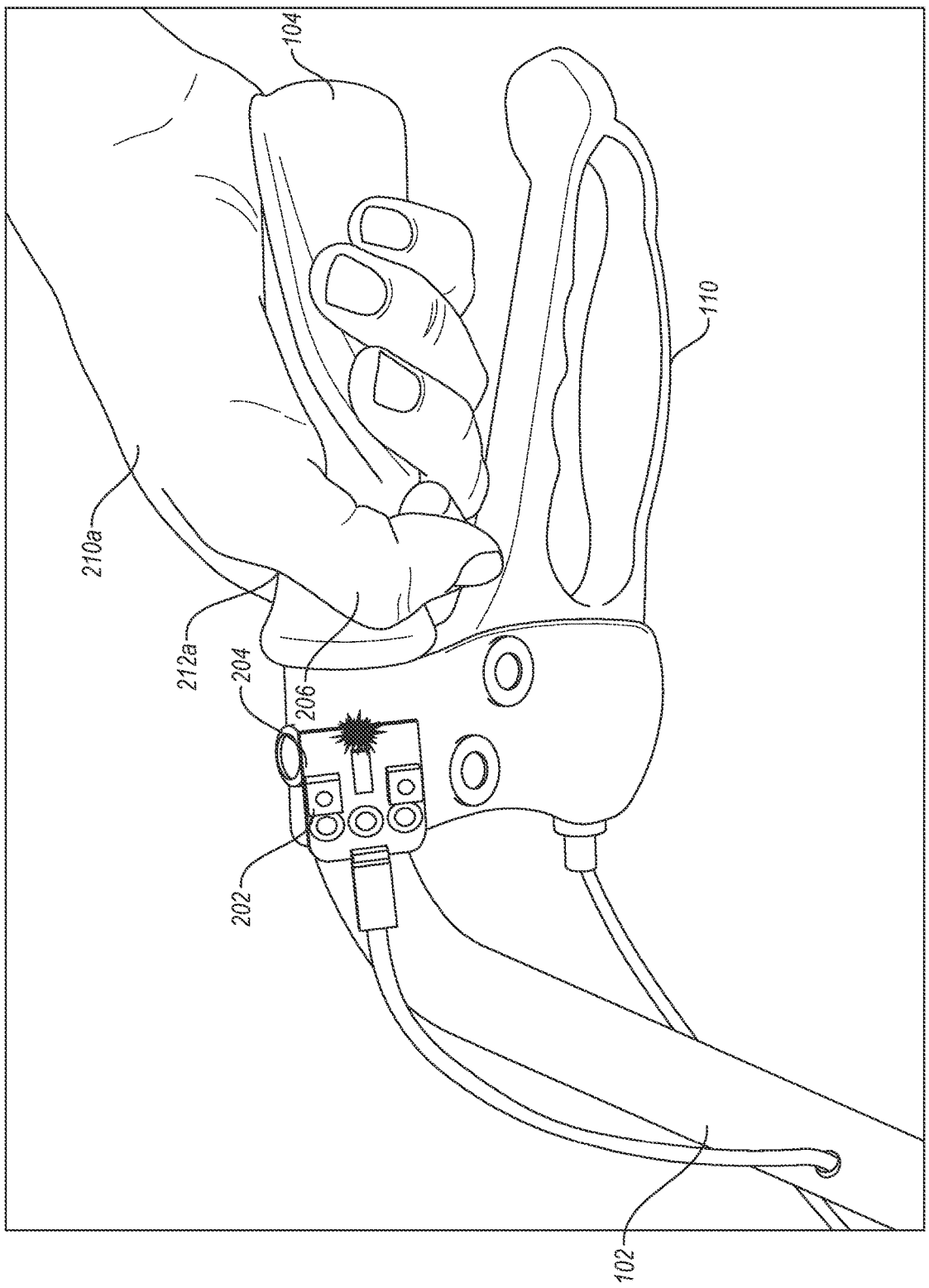
FIG. 2B illustrates an example handle of a walker being grasped by a hand in an example grasp according to one or more embodiments.

FIG. 2B illustrates an example handle 104 of a walker (e.g., walker 100 of FIG. 1) being grasped by a hand 210*a* in an example grasp according to one or more embodiments. In particular, FIG. 2B illustrates handle 104 being grasped by hand 210a in a walking grasp.

Referring to FIG. 2B and FIG. 1 together, hand 210a, in the walking grasp, includes thumb 212a oriented toward front side 124 of walker 100. Additionally or alternatively, thumb 212a is oriented generally toward center of mass 128 of walker 100.

Hand-position sensor 202 (including thumb sensor 204) may be configured to detect hand 210a (in the walking grasp) by detecting thumb 212a at thumb position 206. For example, when a hand 210a of a user is in the walking grasp, the user's thumb 212a may be oriented toward, and located proximate to, the thumb sensor 204, enabling the thumb sensor 204 to detect the presence and/or proximity of the user's thumb 212a when the user's hand 210a is in the walking grasp.

Hand-position sensor 202 may be configured to provide a first signal responsive to hand-position sensor 202 detecting thumb 212a at thumb position 206. The first signal may be interpretable by a processor (e.g., processor 118 of FIG. 1) as an indication that handle 104 is being grasped in the walking grasp. Further, in some embodiments, the first signal may be interpretable by the processor as an indication that a person is standing behind walker 100, facing walker 100, and grasping handle 104.

Figure 2C:
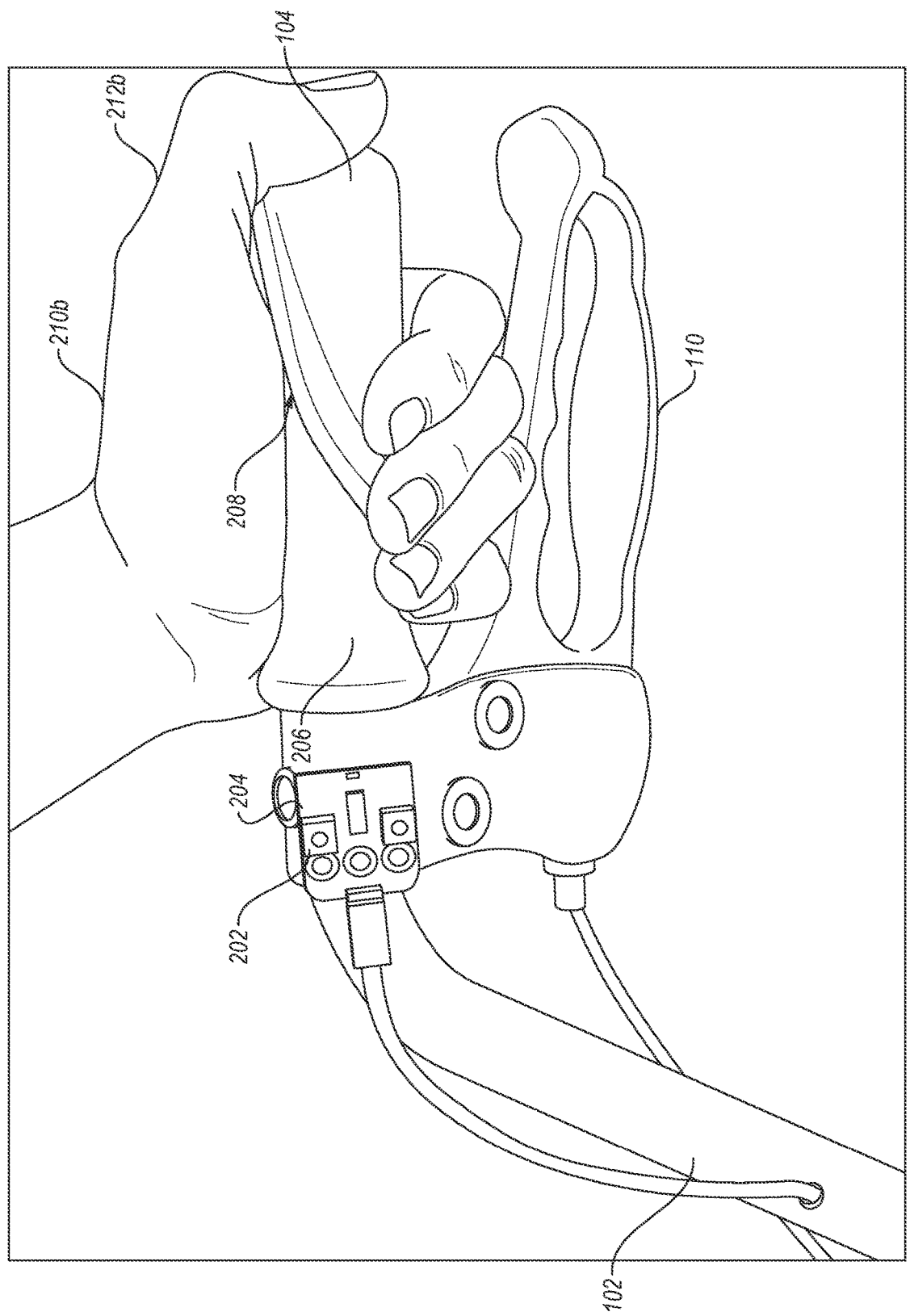
FIG. 2C illustrates an example handle of a walker being grasped by a hand in another example grasp according to one or more embodiments.

FIG. 2C illustrates an example handle 104 of a walker (e.g., walker 100 of FIG. 1) being grasped by a hand 210b in an example grasp according to one or more embodiments. In particular, FIG. 2C illustrates handle 104 being grasped by hand 210b in a standing/sitting grasp.

Referring to FIG. 2C and FIG. 1 together, hand 210b, in the standing/sitting grasp, includes thumb 212b oriented away from front side 124 of walker 100. Additionally or alternatively, thumb 212b is oriented generally away from center of mass 128 of walker 100.

In some embodiments, hand-position sensor 202 (including thumb sensor 204) may be configured to not detect hand 210b (in the standing/sitting grasp) by not detecting thumb 212b at thumb position 206. In some embodiments, hand-position sensor 202 (including thumb sensor 204) may be configured to detect an absence of a hand or thumb at thumb position 206 while hand 210b is in the standing/sitting grasp. For example, when a hand 210b of a user is in the standing/sitting grasp, the user's thumb 212b may be oriented away from, and located distal from, the thumb sensor 204, enabling the thumb sensor 204 to detect the absence of and/or distance to the user's thumb 212b when the user's hand 210b is in the standing/sitting grasp.

Hand-position sensor 202 may be configured to provide a second signal responsive to hand-position sensor 202 not detecting a thumb at thumb position 206. The second signal may be interpretable by a processor (e.g., processor 118 of FIG. 1) as an indication that handle 104 is being grasped in the standing/sitting grasp or that handle 104 is not being grasped. Further, in some embodiments, the second signal may be interpretable by the processor as an indication that a person is not standing behind walker 100, facing walker 100, and grasping handle 104.

Figure 2D:
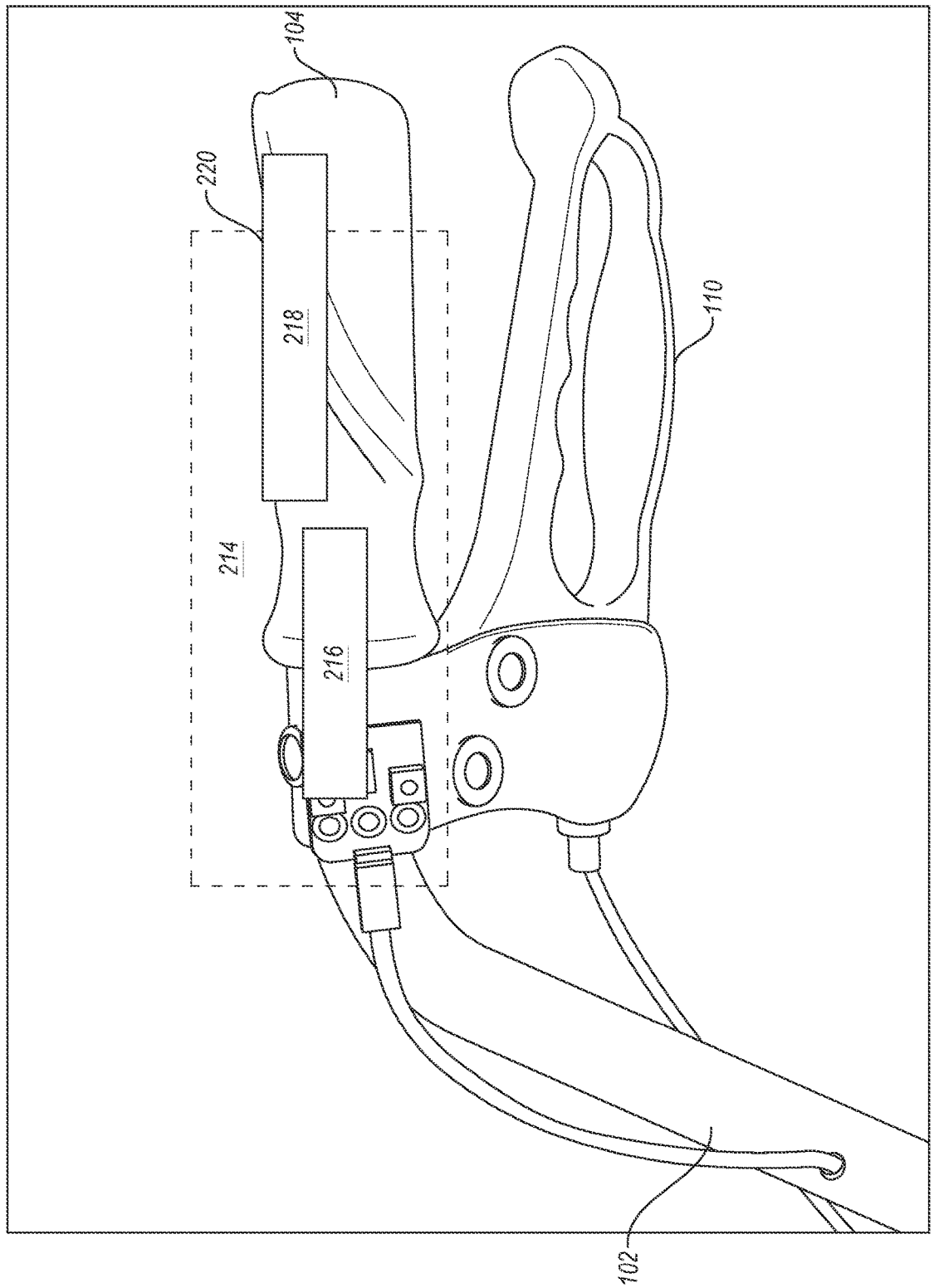
FIG. 2D illustrates another example handle of a walker according to one or more embodiments.

FIG. 2D illustrates another example handle 104 of a walker (e.g., walker 100 of FIG. 1) according to one or more embodiments. Hand-position sensor 214 is arranged proximate to, at, and on handle 104 and is an example of a hand-position sensor (e.g., hand-position sensor 116 of FIG. 1) according to one or more embodiments.

Hand-position sensor 214 includes a first hand-position sensor 216 and a second hand-position sensor 218. Hand-position sensor 214 (including first hand-position sensor 216 and second hand-position sensor 218) may be configured to detect whether a hand is grasping handle 104 in a walking grasp, a standing/sitting grasp, and/or not grasping handle 104.

Each or both of first hand-position sensor 216 and second hand-position sensor 218 may be any suitable sensor, including e.g., an IR proximity sensor, a light-based rangefinder, a sonic range detector, a Doppler-effect sensor, an inductive proximity sensor, a hall-effect sensor, a capacitive touch sensor, a pressure sensor, a temperature sensor, or a conductivity sensor.

For example, first hand-position sensor 216 may be configured to detect a presence of a hand at a first location (e.g., thumb position 206) and second hand-position sensor 218 may be configured to detect a presence of a hand at a second location (e.g., a palm location 220). Based on the detections by first hand-position sensor 216 and second hand-position sensor 218, hand-position sensor 214 may be configured to provide a signal (e.g., to a processor) indicative of whether handle 104 is being grasped and in which grasp. For example, based on a detection of a hand (or thumb) at thumb position 206, hand-position sensor 214 may be configured to provide a first signal (e.g., indicative of the walking grasp). Additionally or alternatively, based on a detection of an absence of a hand (or thumb) at thumb position 206 and a detection of a hand (or palm) at palm location 220, hand-position sensor 214 may be configured to provide a second signal (e.g., indicative of the standing/sitting grasp). Additionally or alternatively, based on a detection of an absence of a hand (or thumb) at thumb position 206 and a detection of an absence of a hand (or palm) at palm location 220, hand-position sensor 214 may be configured to provide the second signal or a third signal (indicative of no grasp).

Additionally or alternatively, in some embodiments, hand-position sensor 214 may include one or more force sensors configured to detect a pressure pattern of a hand grasping handle 104. The pressure pattern may be indicative of whether the handle 104 is being grasped in the walking grasp or the standing/sitting grasp. For example, in a standing/sitting grasp, there may be more pressure at a distal end of handle 104 than at a portion of handle 104 closer to frame 102. In some embodiments, hand-position sensor 214 may include a collection of force sensors configured to map the hand on the handle 104 such that a determination may be made regarding whether the handle is being grasped in the standing/sitting grasp or the walking grasp.

Figure 3A:
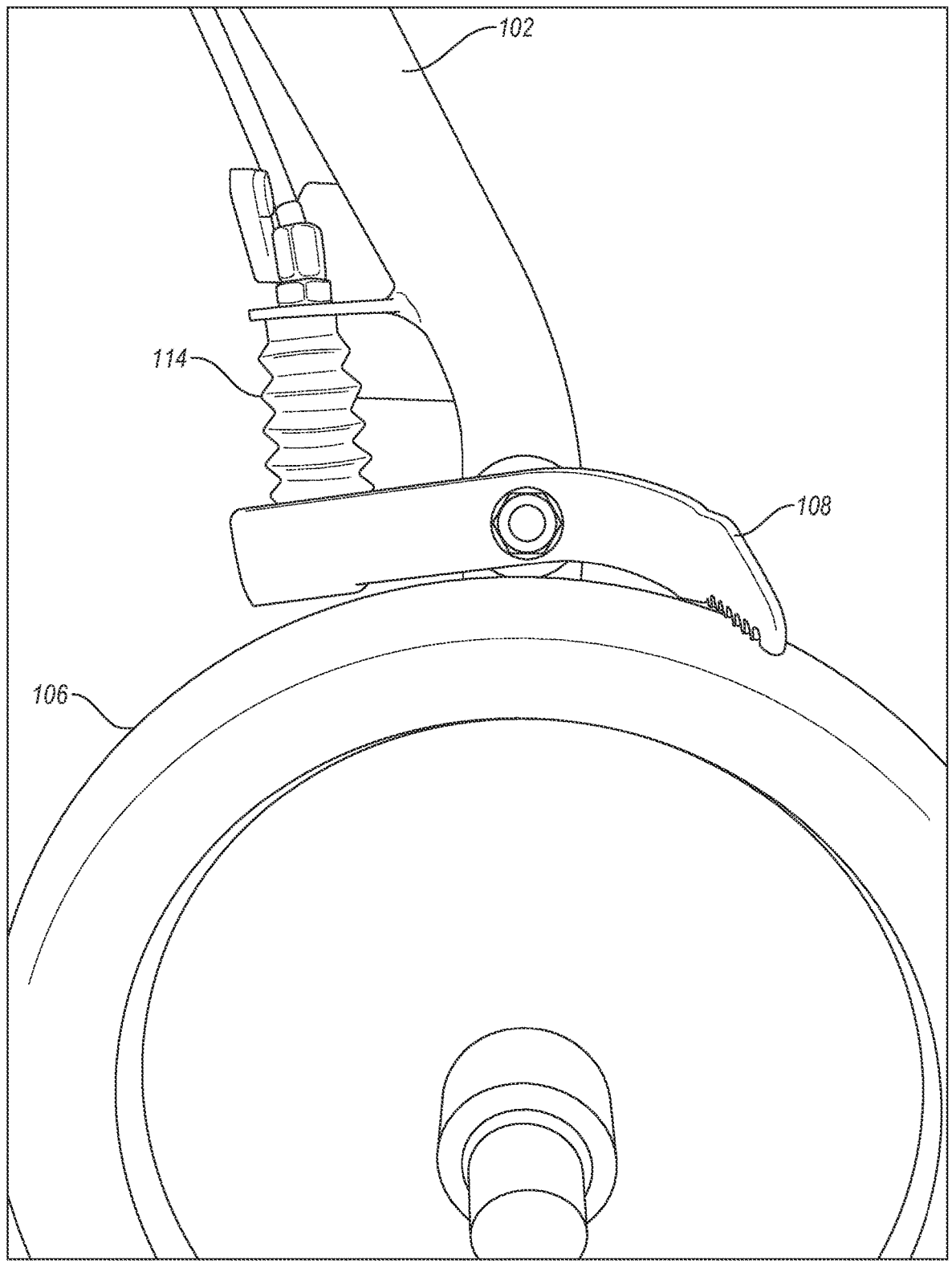
FIG. 3A illustrates an example brake of a walker in an engaged state according to one or more embodiments.

FIG. 3A illustrates an example brake 108 of a walker (e.g., walker 100 of FIG. 1) in an engaged state according to one or more embodiments. Wheel 106 may be arranged at a bottom portion of frame 102 and brake 108 may be arranged at frame 102 proximate to and/or in contact with wheel 106. In the engaged state, brake 108 may be configured to resist rotation of wheel 106.

The engaged state may include varying degrees of applied resistance to rotation of wheel 106. For example, the engaged state may include an amount of applied pressure configured to slow rotation of wheel 106 but not to abruptly halt rotation of wheel 106.

As can be seen in the example of FIG. 3A, brake actuator 114 is arranged in line with a brake cable (e.g., that may be coupled to hand brake 110 of FIG. 1). Such an arrangement may allow hand brake 110 to be operative in addition to the automatic braking system. In cases where the brake 108 is a cable-actuated brake, for example, a lever-brake, as illustrated in FIG. 3A, and or a cable-actuated disc brakes (not illustrated), brake actuator 114 may be arranged in line with the cable. In cases where the brake 108 is hydraulically-actuated, the same functionality may be obtained by arranging the brake actuator 114 to push a plunger of hydraulic fluid to apply the brake 108.

Figure 3B:
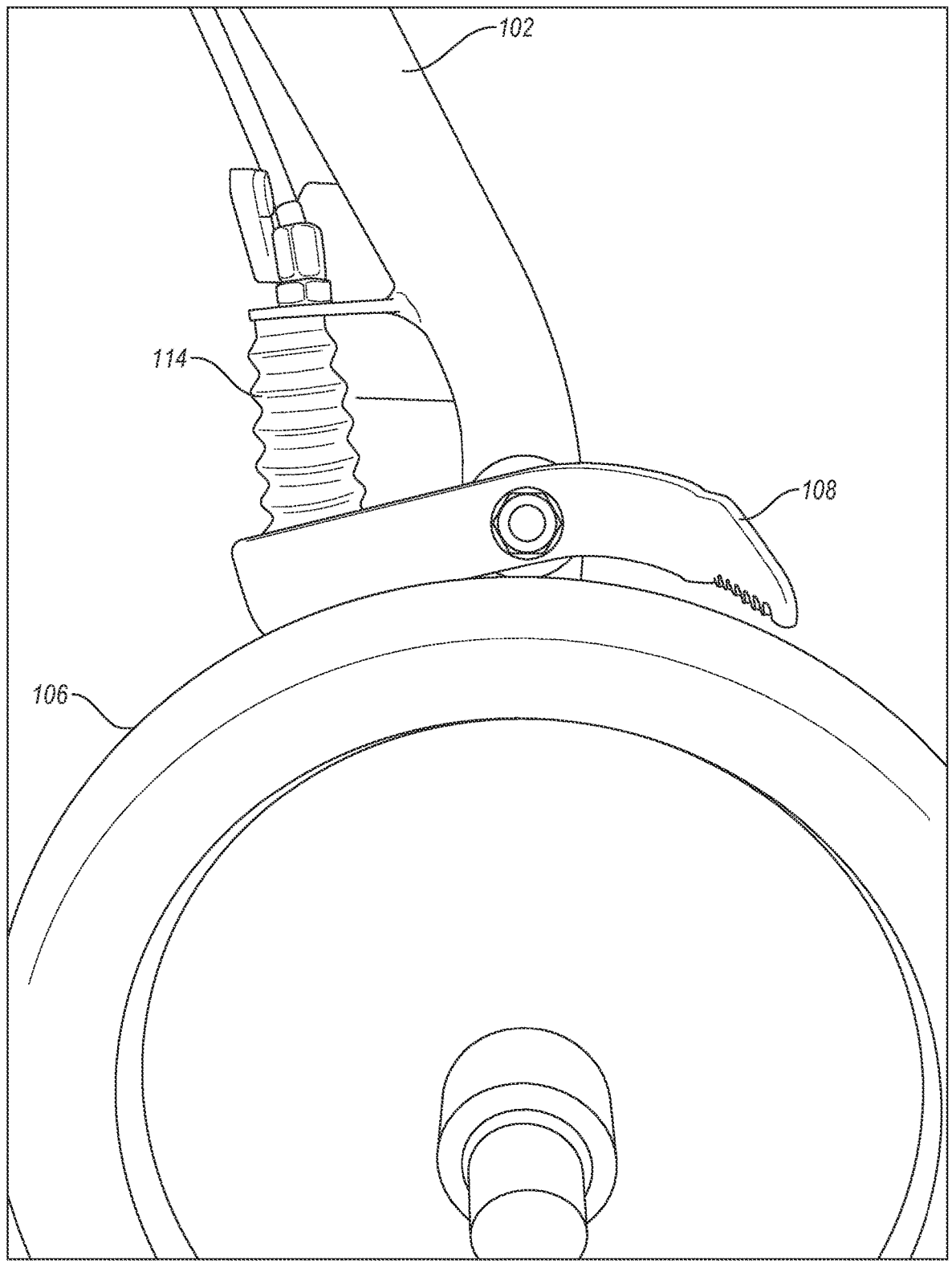
FIG. 3B illustrates an example brake of a walker in a disengaged state according to one or more embodiments.

FIG. 3B illustrates an example brake of a walker (e.g., walker 100 of FIG. 1) in a disengaged state according to one or more embodiments. In the disengaged state, brake 108 may be configured to not resist rotation of wheel 106. For example, the brake 108 may not make contact with the wheel 106 when the brake 108 is in the disengaged state.

Figure 4:
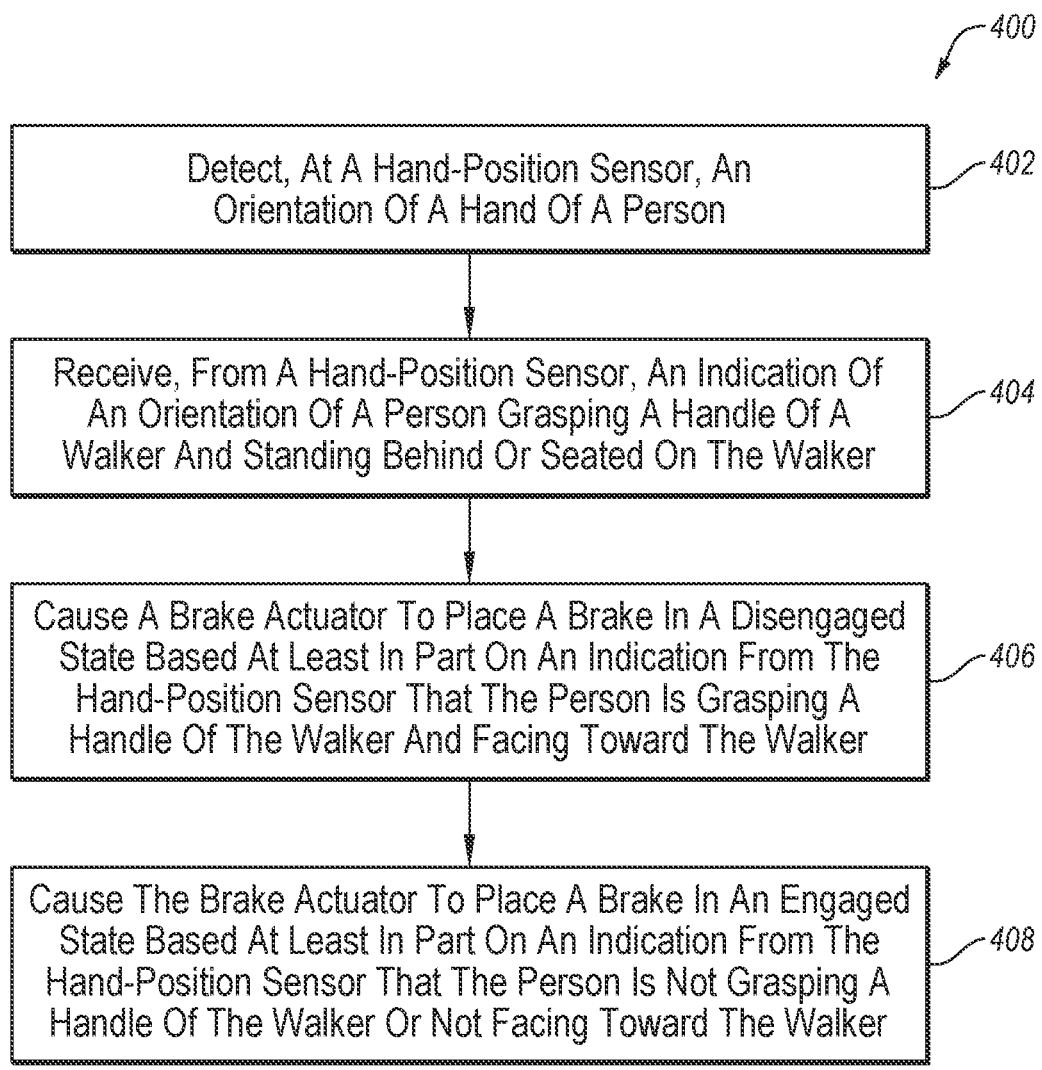
FIG. 4 is a flowchart illustrating an example method 400 according to one or more embodiments.

FIG. 4 is a flowchart illustrating an example method 400 according to one or more embodiments. Method 400 may be arranged in accordance with at least one embodiment described in the present disclosure. Method 400 may be performed, in some embodiments, by a device or system, such as automatic braking system described with regard to FIG. 1, or another device or system. Although illustrated as discrete blocks, various blocks may be divided into additional blocks, combined into fewer blocks, or eliminated, depending on the desired implementation.

At block 402, an orientation of a hand may be detected at a hand-position sensor. The orientation of the hand may be a direction in which a thumb of the hand is pointing. For example, the orientation of the hand may be a walking grasp or a standing/sitting grasp.

At block 404, an indication of an orientation of a person may be received from a hand-position sensor. The person may be grasping a handle of a walker and standing behind or seated on the walker. The indication of the orientation of the person may be based on the detected orientation of the hand of the person. For example, a walking grasp may be indicative that the person is grasping a handle of the walker and facing toward the walker and a standing/sitting grasp may be indicative that the person is not grasping a handle of the walker or not facing toward the walker.

At block 406, a brake actuator may be caused to place a brake in a disengaged state based at least in part on an indication from the hand-position sensor that the person is grasping a handle of the walker and facing toward the walker.

At block 408, a brake actuator may be caused to place the brake in an engaged state based at least in part on an indication from the hand-position sensor that the person is not grasping a handle of the walker or not facing toward the walker.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 5:
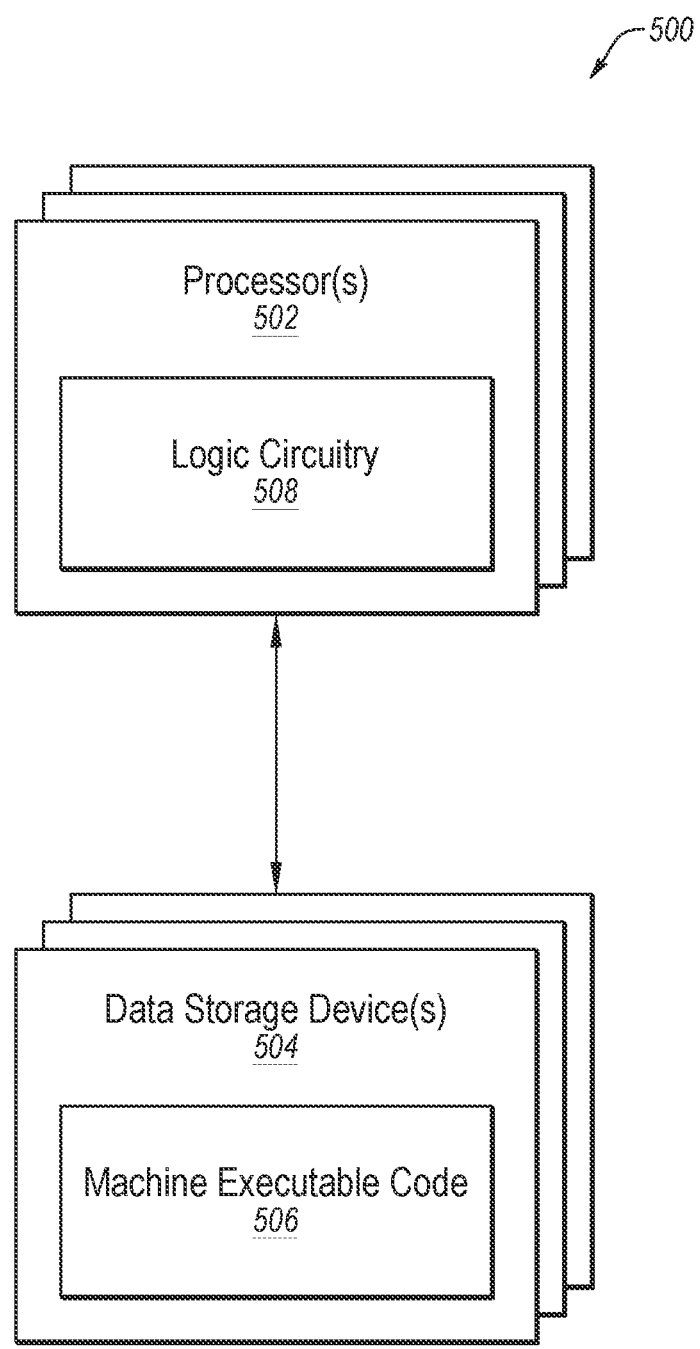
FIG. 5 illustrates a functional block diagram of an example device that may be used to implement various functions, operations, acts, processes, or methods, in accordance with one or more embodiments.

FIG. 5 is a block diagram of an example device 500 that, in some embodiments, may be used to implement various functions, operations, acts, processes, and/or methods disclosed herein. Device 500 includes one or more processors 502 (sometimes referred to herein as "processors 502") operably coupled to one or more apparatuses such as data storage devices (sometimes referred to herein as "storage 504"), without limitation. Storage 504 includes machine executable code 506 stored thereon (e.g., stored on a computer-readable memory) and processors 502 include logic circuitry 508. Machine executable code 506 include information describing functional elements that may be implemented by (e.g., performed by) logic circuitry 508. Logic circuitry 508 is adapted to implement (e.g., perform) the functional elements described by machine executable code 506. Device 500, when executing the functional elements described by machine executable code 506, should be considered as special purpose hardware configured for carrying out the functional elements disclosed herein. In some embodiments, processors 502 may be configured to perform the functional elements described by machine executable code 506 sequentially, concurrently (e.g., on one or more different hardware platforms), or in one or more parallel process streams.

When implemented by logic circuitry 508 of processors 502, machine executable code 506 is configured to adapt processors 502 to perform operations of embodiments disclosed herein. For example, machine executable code 506 may be configured to adapt processors 502 to perform at least a portion or a totality of method 400 of FIG. 4. As another example, machine executable code 506 may be configured to adapt processors 502 to perform at least a portion or a totality of the operations discussed with regard to the automatic braking system of FIG. 1, and more specifically, one or more of the operations discussed with regard to processor 118.

Processors 502 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, processors 502 may include any conventional processor, controller, microcontroller, or state machine. Processors 502 may also be implemented as a combination of computing devices, such as a combination of a DSP and a microprocessor, a plurality of microprocessors, one or more microprocessors in conjunction with a DSP core, or any other such configuration.

In some embodiments, storage 504 includes volatile data storage (e.g., random-access memory (RAM)), non-volatile data storage (e.g., Flash memory, a hard disc drive, a solid state drive, erasable programmable read-only memory (EPROM), etc.). In some embodiments, processors 502 and storage 504 may be implemented into a single device (e.g., a semiconductor device product, a system on chip (SOC), etc.). In some embodiments, processors 502 and storage 504 may be implemented into separate devices. As used herein, the term "storage" excludes transitory signals disembodied from any tangible, hardware device.

In some embodiments, machine executable code 506 may include computer-readable instructions (e.g., software code, firmware code). By way of non-limiting example, the computer-readable instructions may be stored by storage 504, accessed directly by processors 502, and executed by processors 502 using at least logic circuitry 508. Also by way of non-limiting example, the computer-readable instructions may be stored on storage 504, transmitted to a memory device (not shown) for execution, and executed by processors 502 using at least logic circuitry 508. Accordingly, in some embodiments logic circuitry 508 includes electrically configurable logic circuitry.

In some embodiments, machine executable code 506 may describe hardware (e.g., circuitry) to be implemented in logic circuitry 508 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog, SystemVerilog or very large scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 508 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments machine executable code 506 may include an HDL, an RTL, a GL description, a mask level description, other hardware description, or any combination thereof.

In embodiments where machine executable code 506 includes a hardware description (at any level of abstraction), a system (not shown, but including storage 504) may be configured to implement the hardware description described by machine executable code 506. By way of non-limiting example, processors 502 may include a programmable logic device (e.g., an FPGA or a PLC) and the logic circuitry 508 may be electrically controlled to implement circuitry corresponding to the hardware description into logic circuitry 508. Also by way of non-limiting example, logic circuitry 508 may include hard-wired logic manufactured by a manufacturing system (not shown, but including storage 504) according to the hardware description of machine executable code 506.

Regardless of whether machine executable code 506 includes computer-readable instructions or a hardware description, logic circuitry 508 is adapted to perform the functional elements described by machine executable code 506 when implementing the functional elements of machine executable code 506. It is noted that although a hardware description may not directly describe functional elements, a hardware description indirectly describes functional elements that the hardware elements described by the hardware description are capable of performing.

The description includes examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another. As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A walker comprising:
    a frame;
    a wheel positioned at a bottom of the frame;
    a brake selectively positionable in an engaged state, in which the brake resists rotation of the wheel, or a disengaged state, in which the brake does not resist rotation of the wheel;
    a brake actuator configured to place the brake in the engaged state or the disengaged state;
    a handle positioned at a top of the frame;
    a hand-position sensor configured to provide an indication of an orientation of a person grasping the handle and standing behind the walker, wherein the indication comprises one of:
        a first signal indicative that the person is grasping the handle of the walker and facing toward the walker; or
        a second signal indicative that the person is not grasping the handle of the walker or not facing toward the walker; and
    a processor communicatively connected to the brake actuator and the hand-position sensor, the processor configured to:
        receive, from the hand-position sensor, the indication of the orientation of the person grasping the handle and standing behind the walker;
        cause the brake actuator to place the brake in the disengaged state based at least in part on receiving the first signal; and
        cause the brake actuator to place the brake in the engaged state based at least in part on receiving the second signal.

2. The walker of claim 1, wherein the walker further comprises:
a back side, wherein the walker is configured to be used by the person at the back side of the walker; and
a front side opposite the back side,
wherein the hand-position sensor is configured to provide the first signal when the person grasps the handle of the walker with a thumb of a hand at the handle is-oriented toward the front side of the walker and
wherein the hand-position sensor is configured to provide the second signal when the person grasps the handle of the walker with a thumb of a hand at the handle oriented away from the front side of the walker.

3. The walker of claim 1, wherein the hand-position sensor is configured to provide the first signal when the person grasps the handle of the walker with a thumb of a hand at the handle is oriented generally toward a center of mass of the walker and
wherein the hand-position sensor is configured to provide the second signal when the person grasps the handle of the walker with a thumb of a hand at the handle oriented generally away from a center of mass of the walker.

4. The walker of claim 1, wherein the hand-position sensor is further configured to provide the second signal unless the handle is being grasped in a walking grasp.

5. The walker of claim 1, wherein the hand-position sensor is further configured to detect a walking grasp and to detect a standing/sitting grasp.

6. The walker of claim 1, wherein the hand-position sensor comprises two or more sensors configured to collectively detect whether the handle is being grasped in a walking grasp.

7. The walker of claim 6, wherein the two or more sensors are further configured to collectively detect whether the handle is being grasped in a standing/sitting grasp.

8. The walker of claim 1, wherein the hand-position sensor comprises a thumb sensor configured to detect whether a thumb is at a position of the handle, and
wherein the hand-position sensor is configured to provide the first signal responsive to the thumb sensor detecting a thumb at the position.

9. The walker of claim 8, wherein providing the hand-position sensor is configured to provide the second signal responsive to the thumb sensor detecting an absence of a thumb at the position.

10. The walker of claim 8, wherein the hand-position sensor is further configured to provide the second signal responsive to the thumb sensor not detecting a thumb at the position.

11. The walker of claim 1, wherein the hand-position sensor comprises a pressure sensor configured to detect a first pressure pattern of indicative of a walking grasp, and
wherein the hand-position sensor is configured to provide the first signal responsive to the pressure sensor detecting the first pressure pattern.

12. The walker of claim 11, wherein the pressure sensor is further configured to detect a second pressure pattern indicative of a standing/sitting grasp, and
wherein the hand-position sensor is configured to provide the second signal responsive to the pressure sensor detecting the second pressure pattern.

13. The walker of claim 11, wherein the hand-position sensor is further configured to provide the second signal responsive to the pressure sensor not detecting the first pressure pattern.

14. The walker of claim 1, wherein the hand-position sensor comprises one or more of: an infrared proximity sensor, an electrically conductive pad, a resistive-type force sensor, a capacitive force sensor, an ultrasonic distance sensor, a light detection and ranging sensor, and a time of flight sensor.

15. The walker of claim 1, wherein the hand-position sensor comprises a proximity sensor, wherein the handle further comprises a backstop, and wherein the proximity sensor is arranged relative to the backstop to limit a detection range of the proximity sensor.

16. The walker of claim 1, further comprising:
a seat; and
a distance sensor configured to provide, to the processor, an indication of a distance between the distance sensor and a person at a back of the walker,
wherein the processor is further configured to cause the brake actuator to place the brake in the engaged state based on the indication of the distance between the distance sensor and a person at a back of the walker.

17. The walker of claim 16, wherein the processor is further configured to cause the brake actuator to place the brake in the engaged state responsive to a determination, based on the indication from the distance sensor, that the person is at least one of:
approaching the seat to sit on the seat,
seated on the seat, or rising from the seat.

18. An automatic braking system for a walker comprising:
a brake actuator configured to place a brake of a walker in an engaged state, in which the brake resists rotation of a wheel of the walker, or a disengaged state, in which the brake does not resist rotation of the wheel;
a hand-position sensor configured to:
detect a portion of a hand of a person at a location of a handle of the walker when the person stands behind the walker, facing the walker, and grasps the handle,
detect an absence of a portion of a hand of the person at the location of the handle when the person stands behind the walker, facing away from the walker, and grasps the handle;
provide an indication of an orientation of a person grasping the handle and standing behind the walker, wherein the indication comprises one of:
an indication that the person is grasping the handle of the walker and facing toward the walker; or
an indication that the person is not grasping the handle of the walker or not facing toward the walker; and
a processor communicatively connected to the brake actuator and the hand-position sensor, the processor configured to:
receive, from the hand-position sensor, the indication of the orientation of the person grasping the handle and standing behind the walker;
cause the brake actuator to place the brake in the disengaged state based at least in part on receiving the indication from the hand-position sensor that the person is grasping the handle of the walker and facing toward the walker; and
cause the brake actuator to place the brake in the engaged state based at least in part on receiving the indication from the hand-position sensor that the person is not grasping a handle of the walker or not facing toward the walker.

19. The automatic braking system of claim 18, the hand-position sensor further configured to detect an absence of a portion of a hand of the person at the location of the handle when the person lowers themselves on to a seat of the walker while grasping the handle or stands from the seat while grasping the handle.

20. The automatic braking system of claim 18, wherein the automatic braking system further comprises a distance sensor configured to detect a distance between the distance sensor and a person at a back of the walker and wherein the processor is further configured to cause the brake actuator to place the brake in the engaged state responsive to a determination, based on the distance detected by the distance sensor, that the person is approaching a seat of the walker to sit on the seat, the person is seated on the seat, or the person is rising from the seat.

21. The automatic braking system of claim 18, wherein the hand-position sensor comprises a thumb sensor configured to detect a presence or an absence of a thumb at the location.

22. The automatic braking system of claim 18, wherein the hand-position sensor comprises a pressure sensor configured to detect a pressure pattern indicative of the person standing behind the walker, facing the walker, and grasping the handle, the pressure pattern based on a detection of a presence or absence of a portion of a hand at the location.

23. A method of controlling a brake of a walker, the method comprising:
receiving, from a hand-position sensor, an indication of an orientation of a person grasping a handle of a walker and standing behind the walker;
causing a brake actuator to place a brake in a disengaged state based at least in part on an indication from the hand-position sensor that the person is grasping a handle of the walker and facing toward the walker; and
causing the brake actuator to place the brake in an engaged state based at least in part on an indication from the hand-position sensor that the person is not grasping a handle of the walker or not facing toward the walker.

24. The method of claim 23, further comprising causing the brake actuator to place the brake in the engaged state based on a second indication from a distance sensor that the person is approaching a seat of the walker to sit on the seat, seated on the seat, or rising from the seat.

25. The method of claim 23, further comprising, detecting, at the hand-position sensor, an orientation of a hand of the person, the indication of the orientation of the person based on the detected orientation of the hand of the person.

26. The method of claim 25, wherein detecting the orientation of the hand comprises detecting a pressure pattern at a handle of the walker, the pressure pattern indicative of the orientation of the hand.

* * * * *